3,244,720
OCTAHYDRO-9-ACRIDANONES
Joseph Albert Meschino, North Wales, Pa., assignor to McNeil Laboratories, Incorporated, a corporation of Pennsylvania
No Drawing. Filed Jan. 21, 1965, Ser. No. 427,086
18 Claims. (Cl. 260—279)

This invention relates to octahydro - 9 - acridanones having the formula

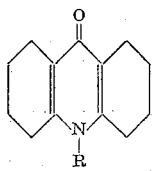

wherein R is a member selected from the group consisting of hydrogen, loweralkyl, aminoloweralkyl and diloweralkylaminoloweralkyl; and the non-toxic therapeutically active acid addition salts thereof.

The term "loweralkyl" includes alkyl groups containing 1 to 7 carbon atoms, including saturated aliphatic chains, straight or branched, such as methyl, ethyl, propyl, isoethyl, propyl and isopropyl.

The term "loweralkyl" in the terms "aminoloweralkyl" and "diloweralkylaminoloweralkyl" includes alkyl groups containing 1 to 3 carbon atoms, including saturated aliphatic chains, straight or branched, such as methyl, propyl and isopropyl.

The aminoloweralkylacridanones and the diloweralkylaminoloweralkylacridanones of this invention may be converted to their acid addition salts by reaction with an appropriate acid such as hydrochloric, sulfuric, acetic, maleic, fumaric acids, etc.

The compounds of this invention absorb ultra violet light and are useful as sun-screening materials in salves and ointments. In addition, because of their solubility in organic materials generally, they may be used as ultra violet absorbers in plastics and resins, such as polystyrene, polyethylene, polypropylene (methacrylate resins, polyacylamides, polyacrylonitrile fibers), polyamide fibers (nylon e.g.) and polyester fibers. In the latter use, the inclusion of 0.01 to 5 percent of the absorber, based on the polymer weight, is sufficient to render protection against ultra violet light, such as in plastic film and light filters. The absorber may be incorporated in the mixture of monomers before polymerization to form the polymer or it may be incorporated in the polymer at any stage during its handling, as by milling into the polymer with other compounding ingredients or during the spinning of polymers into fibers, etc.

The novel compounds of this invention may be prepared by reducing the appropriate 1,2,3,4-tetrahydro-10-R-9-acridanones with hydrogen in the presence of a suitable noble metal catalyst such as, for example, platinum, palladium, ruthenium, rhodium, etc. These reducing agents may be employed in the presence of suitable solvents such as alcohols, for example, methanol, ethanol, isopropanol, etc., or water containing an appropriate amount of a suitable acid such as, for example, hydrochloric, sulfuric, acetic, etc.

The starting materials for the preparation of the novel 1,2,3,4,5,6,7,8-octahydro-10-R-9-acridanones may be prepared by reacting the appropriately substituted anthranilic acids with cyclohexanone as described, for example, by H. Tiedtke, Ber., 42, 621 (1909).

The following examples are intended to illustrate but not to limit the scope of the present invention.

*Example I*

A mixture of 5 g. of 1,2,3,4-tetrahydro-9-acridanone and 0.5 g. of Adams' catalyst in 100 ml. of water containing 50 ml. of concentrated hydrochloric acid is shaken under 3 atmospheres of hydrogen until the uptake of hyrogen stops. Filtration followed by the addition of 50 percent sodium hydroxide solution precipitates the product, 1,2,3,4,5,6,7,8 - octahydro - 9-acridanone, M.P. greater than 350° C.

*Example II*

A mixture of 5 g. of 1,2,3,4-tetrahydro-10-methyl-9-acridanone and 0.5 g. of Adams' catalyst in 100 ml. of water containing 50 ml. of concentrated hydrochloric acid is shaken under 3 atmospheres of hydrogen until the uptake of hydrogen stops. Filtration followed by the addition of 50 percent sodium hydroxide solution precipitates the product, 1,2,3,4,5,6,7,8 - octahydro-10-methyl-9-acridanone, M.P. 192–194° C.

*Example III*

A mixture of 10 g. of 1,2,3,4-tetrahydro-10-dimethylaminopropyl-9-acridanone and 1 g. of Adams' catalyst in 150 ml. of water containing 50 ml. of concentrated hydrochloric acid is shaken under 3 atmospheres of hydrogen until the uptake of hydrogen ceases. Filtration followed by the addition of 50 percent sodium hydroxide and extraction with methylene chloride gives 1,2,3,4,5,6,7,8-octahydro - 10 - dimethylaminopropyl-9-acridanone as a liquid. The product is converted to the maleate salt, M.P. 218–219° C.

*Example IV*

Using the procedure of Example II and replacing 1,2,3,4-tetrahydro-10-methyl-9-acridanone with an equivalent amount of one of the following 1,2,3,4-tetrahydro-10-ethyl-9-acridanone
1,2,3,4-tetrahydro-10-propyl-9-acridanone
1,2,3,4-tetrahydro-10-isopropyl-9-acridanone
1,2,3,4-tetrahydro-10-(n-butyl)-9-acridanone
1,2,3,4-tetrahydro-10-isobutyl-9-acridanone
1,2,3,4-tetrahydro-10-isopentyl-9-acridanone
1,2,3,4-tetrahydro-10-hexyl-9-acridanone
1,2,3,4-tetrahydro-10-heptyl-9-acridanone the corresponding 1,2,3,4,5,6,7,8-octahydro-10-loweralkyl-9-acridanone is formed, for example 1,2,3,4,5,6,7,8-octahydro-10-ethyl-9-acridanone
1,2,3,4,5,6,7,8-octahydro-10-propyl-9-acridanone
1,2,3,4,5,6,7,8-octahydro-10-isopropyl-9-acridanone
1,2,3,4,5,6,7,8-octahydro-10-(n-butyl)-9-acridanone
1,2,3,4,5,6,7,8-octahydro-10-isobutyl-9-acridanone
1,2,3,4,5,6,7,8-octahydro-10-isopentyl-9-acridanone
1,2,3,4,5,6,7,8-octahydro-10-hexyl-9-acridanone
1,2,3,4,5,6,7,8-octahydro-10-heptyl-9-acridanone

*Example V*

Using the procedure of Example III and replacing 1,2,3,4-tetrahydro-10-dimethylaminopropyl-9 - acridanone with an equivalent amount of one of the following 1,2,3,4-tetrahydro-10-dimethylaminomethyl-9-acridanone
1,2,3,4-tetrahydro-10-aminoisopropyl-9-acridanone
1,2,3,4-tetrahydro-10-aminopropyl-9-acridanone
1,2,3,4-tetrahydro-10-aminoethyl-9-acridanone
1,2,3,4-tetrahydro-10-diethylaminomethyl-9-acridanone
1,2,3,4-tetrahydro-10-diisopropylaminoethyl-9-acridanone
1,2,3,4-tetrahydro-10-diisopropylaminopropyl-9-acridanone
1,2,3,4-tetrahydro-10-dimethylaminoisopropyl-9-acridanone
1,2,3,4-tetrahydro-10-diisopropylaminoisopropyl-9-acridanone the corresponding 1,2,3,4,5,6,7,8 - octahydro-10-aminoloweralkyl-9-acridanone or 1,2,3,4,5,6,7,8-octahydro-10-diloweralkylaminoloweralkyl-9-acridanone is formed, for example, 1,2,3,4,5,6,7,8-octahydro-10-dimethylaminomethyl-9-acridanone
1,2,3,4,5,6,7,8-octahydro-10-aminoisopropyl-9-acridanone
1,2,3,4,5,6,7,8-octahydro-10-aminopropyl-9-acridanone
1,2,3,4,5,6,7,8-octahydro-10-aminoethyl-9-acridanone
1,2,3,4,5,6,7,8-octahydro-10-diethylaminomethyl-9-acridanone
1,2,3,4,5,6,7,8-octahydro-10-diisopropylaminoethyl-9-acridanone
1,2,3,4,5,6,7,8-octahydro-10-diisopropylaminopropyl-9-acridanone
1,2,3,4,5,6,7,8-octahydro-10-dimethylaminoisopropyl-9-acridanone
1,2,3,4,5,6,7,8-octahydro-10-diisopropylaminoisopropyl-9-acridanone

What is claimed is:
1. A member selected from the group of octahydro-9-acridanones having the formula

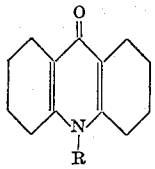

wherein R is a member selected from the group consisting of hydrogen, loweralkyl, aminoloweralkyl and diloweralkylaminoloweralkyl; and the non-toxic, therapeutically active acid addition salts thereof.
2. 1,2,3,4,5,6,7,8-octahydro-9-acridanone.
3. 1,2,3,4,5,6,7,8-octahydro-10-methyl-9-acridanone.
4. 1,2,3,4,5,6,7,8-octahydro-10 - dimethylaminopropyl-9-acridanone.
5. 1,2,3,4,5,6,7,8-octahydro-10-ethyl-9-acridanone.
6. 1,2,3,4,5,6,7,8-octahydro-10-propyl-9-acridanone.
7. 1,2,3,4,5,6,7,8-octahydro-10-isopropyl-9-acridanone.
8. 1,2,3,4,5,6,7,8-octahydro-10-(n-butyl)-9-acridanone.
9. 1,2,3,4,5,6,7,8-octahydro-10-isobutyl-9-acridanone.
10. 1,2,3,4,5,6,7,8-octahydro-10-isopentyl-9-acridanone.
11. 1,2,3,4,5,6,7,8-octahydro-10-hexyl-9-acridanone.
12. 1,2,3,4,5,6,7,8-octahydro-10-dimethylaminomethyl-9-acridanone.
13. 1,2,3,4,5,6,7,8-octahydro-10-aminoisopropyl-9-acridanone.
14. 1,2,3,4,5,6,7,8-octahydro-10 - aminopropyl-9-acridanone.
15. 1,2,3,4,5,6,7,8-octahydro-10 - diethylaminoethyl-9-acridanone.
16. 1,2,3,4,5,6,7,8 - octahydro-10 - diisopropylaminoethyl-9-acridanone.
17. 1,2,3,4,5,6,7,8 - octahydro-10 - diisopropylaminopropyl-9-acridanone.
18. 1,2,3,4,5,6,7,8-octahydro-10-diisopropylaminoisopropyl-9-acridanone.

No references cited.

HENRY R. JILES, *Primary Examiner.*

NICHOLAS S. RIZZO, *Examiner.*

DONALD G. DAUS, *Assistant Examiner.*